(12) United States Patent
Greenshields et al.

(10) Patent No.: US 12,599,140 B2
(45) Date of Patent: Apr. 14, 2026

(54) AGRICULTURAL COMPOSITIONS AND METHODS FOR THE DELIVERY OF PLANT HEALTH-PROMOTING MICROBES

(71) Applicant: Insight Plant Health Corp., Saskatoon (CA)

(72) Inventors: Dave Greenshields, Saskatoon (CA); Aruna Wickramarathna, Saskatoon (CA); Juan Felipe Mateus Maldonado, Saskatoon (CA); Kassidy Macpherson, Saskatoon (CA)

(73) Assignee: Insight Plant Health Corp., Saskatoon (CA)

( * ) Notice: Subject to any disclaimer, the term of this patent is extended or adjusted under 35 U.S.C. 154(b) by 0 days.

(21) Appl. No.: 18/653,104

(22) Filed: May 2, 2024

(65) Prior Publication Data

US 2025/0107531 A1 Apr. 3, 2025

(51) Int. Cl.
| | |
|---|---|
| *A01N 63/22* | (2020.01) |
| *A01N 63/20* | (2020.01) |
| *A01N 63/27* | (2020.01) |
| *A01N 63/28* | (2020.01) |
| *A01N 63/30* | (2020.01) |
| *A01P 3/00* | (2006.01) |
| *A01P 21/00* | (2006.01) |

(52) U.S. Cl.
CPC ............. *A01N 63/22* (2020.01); *A01N 63/20* (2020.01); *A01N 63/27* (2020.01); *A01N 63/28* (2020.01); *A01N 63/30* (2020.01); *A01P 3/00* (2021.08); *A01P 21/00* (2021.08)

(58) Field of Classification Search
CPC ........ A01N 63/22; A01N 63/20; A01N 63/27; A01N 63/28; A01N 63/30; A01P 3/00
See application file for complete search history.

(56) References Cited

U.S. PATENT DOCUMENTS

2012/0252672 A1* 10/2012 Kang ..................... A01N 43/16
504/117

FOREIGN PATENT DOCUMENTS

| | | |
|---|---|---|
| WO | 2015/126571 | 8/2015 |
| WO | 2024064213 | 3/2024 |

* cited by examiner

*Primary Examiner* — Ruth A Davis
(74) *Attorney, Agent, or Firm* — Michael R Williams; Ryan W Dupuis; Ade & Company Inc.

(57) ABSTRACT

This invention provides agricultural compositions and methods wherein plant health-promoting microbes are delivered on an improved granular carrier comprising milled plant parts and biological viability compounds that allows the microbes to remain stable at low moisture and to reproduce at high moisture.

5 Claims, 8 Drawing Sheets

Fig. 9

Lentil nodule number

AGRICULTURAL COMPOSITIONS AND METHODS FOR THE DELIVERY OF PLANT HEALTH-PROMOTING MICROBES

PRIOR APPLICATION INFORMATION

The instant application claims priority to Canadian Patent Application 3,215,150, filed Oct. 3, 2023 and entitled "Agricultural compositions and methods for the delivery of plant health-promoting microbes", the entire contents of which are hereby incorporated herein for all purposes.

BACKGROUND OF THE INVENTION

Modern agriculture is a resource-intensive practice and there has been interest in finding more sustainable and environmentally friendly farming practices. Using biological agents such as microbes to address resource requirements and plant health issues has been one of these sustainable farming practices, and a great deal of research has been directed at finding agriculturally beneficial microbes that can complement or replace fertilizers and pesticides in agriculture.

It is well-understood that nitrogen is the most important plant nutrient in driving plant yields in modern agriculture. Nitrogen-fixing bacteria, also known as diazotrophic bacteria, are microorganisms that have the ability to convert atmospheric nitrogen ($N_2$) gas into a form that plants can use for their growth and this process helps maintain soil fertility and supporting plant nutrition without relying solely on synthetic nitrogen fertilizers. Nitrogen-fixing genera include *Bradyrhizobium, Mesorhizobium, Rhizobium, Sinorhizobium, Methylobacterium*, and *Gluconacetobacter*, among others [Martinez-Romero, Esperanza. "Dinitrogen-fixing prokaryotes." The prokaryotes 2 (2006): 793.].

Second to nitrogen, in terms of importance and application rates in most agricultural settings, is phosphorus. Phosphorus is an essential nutrient for plant growth and development, but it is often present in the soil in forms that are not readily available to plants. Microbes in the soil, either native or introduced, can help make phosphorus more accessible to plants in several ways. Various strains of *Bacillus, Pseudomonas*, and *Penicillium* have been identified for their ability to solubilize phosphorus for uptake by crop plants [Khan, Mohammad Saghir, Almas Zaidi, and Parvaze A. Wani. "Role of phosphate solubilizing microorganisms in sustainable agriculture-a review." Sustainable agriculture (2009): 551-570.].

Chemical and biological pesticides are commonly used to prevent and control disease in crop production. Soil-borne pathogens like *Fusarium, Pythium* and *Rhizoctonia* attack planted seeds, seedlings and roots, which causes disease and reduces the health and yield of crop plants. Chemical and biological pesticides are applied to the seed prior to planting, to the leaves during plant growth, or to the soil prior to planting, at planting or during crop growth to prevent and control these diseases. Biological control agents like *Bacillus, Trichoderma*, and *Streptomyces* have been developed and are marketed and sold for this purpose [Lahlali R, Ezrari S, Radouane N, Kenfaoui J, Esmaeel Q, El Hamss H, Belabess Z, Barka E A. Biological Control of Plant Pathogens: A Global Perspective. Microorganisms. 2022; 10 (3): 596].

In each case, whether the microbe used in agriculture is a nitrogen fixer, a phosphate solubilizer, or a biological pesticide, the microbe must be delivered in proximity to the seed or plant to realize plant health-promoting effects. This proximal delivery can be achieved by spraying the biological agent onto the plant or soil, where it can interact with the plant to provide plant health promoting benefits; by applying the agent directly to seeds, where the effects are realized after planting; or by applying the agent to a solid carrier like a powder or granule, which can then be placed alongside a seed or plant. Along with proximity, microbes in agriculture must be delivered at a high enough titer to enact their function in delivering nitrogen, phosphate or biological control to the crop plant. It is often difficult to maintain a sufficient population and the viability of microbes during all the downstream manufacturing processes, packaging and storage. Furthermore, maintaining viability of the microbes after their application to seeds, soils, plants or in food products is also as important as maintaining viability during the storage period and/or product shelf life.

Solid rhizobial products based on a peat carrier have been used to apply nitrogen-fixing microbes to legume crops for over 100 years. Peat is a good substrate for microbes like *Rhizobium* spp. and *Bradyrhizobium* spp. because it imparts stability to the bacteria through a number of physiological processes including trehalose accumulation and plasma membrane thickening [Casteriano A, Wilkes M A, Deaker R. Physiological changes in rhizobia after growth in peat extract may be related to improved desiccation tolerance. Appl Environ Microbiol. 2013 July; 79 (13): 3998-4007]. The viable bacteria can then be applied to seed as a peat powder or to soil as a peat granule, where they go on to form a symbiotic relationship with the host plant and fix nitrogen. Although peat is a good carrier for microbes in agriculture, peat mining and peatland disruption are major causes of greenhouse gas emissions, contributing 4% of global greenhouse gas emissions annually [UNEP. "Global peatlands assessment—the state of the world's peatlands: Evidence for action toward the conservation, restoration, and sustainable management of peatlands. main report. global peatlands initiative." (2022)]. Peat is also in limited supply, which makes it expensive. Furthermore, peat is not always consistent from batch to batch or source to source, which means that if one source is exhausted, another source may not replicate the characteristics of the exhausted source. Because of the cost, inconsistency, and negative environmental impacts of peat, there is a need for novel alternative carriers for microbes in agriculture.

U.S. patent application Ser. No. 17/674,754 discloses the incorporation of microbes on dry fertilizers by applying a coating inoculated with a biological agent to the dry fertilizer granule.

U.S. Pat. No. 11,691,928 discloses plant-based granular carriers to deliver fertilizer elements to crop plants based on biological demand.

Thus, there remains a need to develop granular carriers for microbes in agriculture that can replace peat and deliver sufficient titers of viable microbes to improve plant health.

SUMMARY OF THE INVENTION

This invention provides compositions and methods for promoting plant health comprising one or more microbes on a carrier comprising milled plant parts and biological viability compounds and delivery of that composition to the soil near a seed.

Employing a carrier comprising milled plant parts and biological viability compounds has various advantages to peat and other carriers for the delivery of plant health-promoting microbes. For example, the application of a granule comprising milled plant parts and biological viability compounds may be more environmentally friendly, cost effective, and consistently predictable in its ability to deliver plant health-promoting microbes to crop plants. Furthermore, the compositions of this invention may flow more easily through agricultural equipment (e.g. an air seeder, drill or planter), resist clumping and attrition more effectively during application, and may be applied at a wider range of rates (e.g. pounds per acre or kilograms per hectare) while delivering the same plant health-promoting effects. Besides these advantages, the compositions and methods of this invention have further advantageous properties in delivering the microbes themselves. Examples of such advantageous properties include: the enhanced stability of the microbes in transport and storage; enhanced stability of the microbes during application; growth, reproduction, and an increase in titer of the microbes following application to the soil near a seed; adequate plant health promotion at lower application titers; and any other advantages familiar to a skilled person.

BRIEF DESCRIPTION OF THE DRAWINGS

FIG. 9: Leaf phosphate levels in V1 corn plants grown in soil inoculated with either of 2 granule types (Granule1 or Granule 2) carrying *Bacillus amyloliquefaciens* (Ba) or *Penicillium bilaiae* (Pb), showing an increase in phosphate concentrations in the corn leaves grown with the phosphate solubilizing microbes.

FIG. 12: Nodule number on lentil plants inoculated with *Rhizobium leguminosarum* carried on either of 2 granule types compared to lentil plants grown from seed treated with *R. leguminosarum*.

DESCRIPTION OF THE PREFERRED EMBODIMENTS

Figure 1:
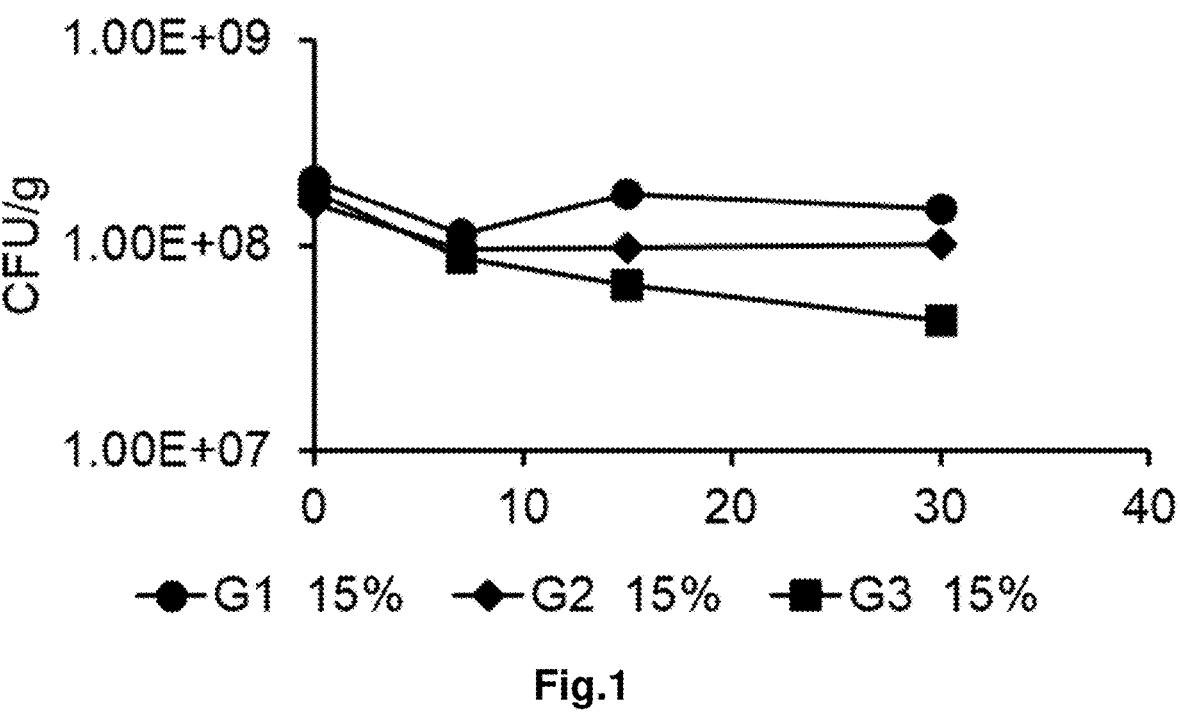
FIG. 1: *Bradyrhizobium japonicum* titer at 15% moisture on 3 different granular carriers (G1-G3).

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

This invention has been developed to promote plant health with an improved agriculturally acceptable carrier capable of delivering viable microbes to plants. This is described in detail in the "Examples" section provided below. The disclosed embodiments further relate to compositions and methods for increasing the availability of phosphorus and/or nitrogen for plant uptake from soil, and for controlling plant diseases, comprising delivery of plant health-promoting microbes on a granule comprising milled plant parts and biological viability compounds.

Definitions

Used herein, the term "agriculturally acceptable carrier" means any material that can be used to deliver actives (e.g. the biological agents and microbes described herein) near a plant using modern agricultural equipment and/or techniques. This invention describes agriculturally acceptable carriers made from milled plant parts and biological viability compounds.

Non-limiting examples of milled plant parts that may be useful in the present disclosure include material selected from the group of plants consisting of pea, lentil, chickpea, faba bean, soybean, dry bean, alfalfa, clover, vetch, canola, mustard, flax, cotton, wheat, durum, barley, corn, oat, buckwheat, triticale, rye, rice, sorghum, potato, canaryseed, sunflower, pine, spruce, birch, poplar, willow, cedar, fir, and/or larch.

Used herein, the term "biological viability compound" means any material that can be used to maintain or enhance the viability or stability of a microbe. Non-limiting examples of biological viability compounds that may be useful in the present disclosure include allose, altrose, arabinose, fructose, galactose, glucose, gulose, iodose, lyxose, mannose, ribose, talose, threose, xylose, cellobiose, chitobiose, gentiobiose, gentiobiulose, isomaltose, kojibiose, lactose, lactulose, laminaribiose, maltose, maltulose, mannobiose, melibiose, melibiulose, nigerose, palatinose, rutinose, rutinulose, sophorose, sucrose, trehalose, turanose, xylobiose, ascorbic acid, ascorbyl palmitate, ascorbyl stearate, calcium ascorbate, carotenoids, lipoic acid, flavonoids, flavonols, potassium ascorbate, sodium ascorbate, thiols (e.g., glutathione, lipoic acid, N-acetyl cysteine), tocopherols, tocotrienols, ubiquinone, uric acid, arabitol, erythritol, fucitol, galactitol, glycerol, iditol, inositol, isomalt, lactitol, maltitol, maltotetraitol, maltotriitol, mannitol, polyglycitol, ribitol, sorbitol, threitol, volemitol, xylitol, humic acids, fulvic acids, alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, valine, and/or selenocysteine.

Used herein, the term "about," when used in reference to a measurable value such as an amount of mass, dose, time, temperature and the like, means variations of 0.1%, 0.25%, 0.5%, 0.75%, 1%, 2%, 3%, 4%, 5%, 6%, 7%, 8%, 9%, or 10%.

Used herein, the term "microbe" means microorganism comprising bacteria, archaea, viruses, and microscopic eukaryotes like fungi and oomycetes.

Used herein, the term "viability" means to be alive in a verifiable way through culture or measurable activity. Viability can be measured in various ways.

Used herein, the term "stability" means maintaining viability over time.

Used herein, the term "milled" means to be cut, ground or disrupted into finer particles.

Used herein, the term "titer" means the number of viable microbial units (e.g. spores, cells, colony forming units, CFU) per unit of weight or volume. Titers of viable microbes useful in the present disclosure range from $1 \times 10^1$ CFU/g to $1 \times 10^{12}$ CFU/g.

Used herein, the term "promoting" means to support, encourage, further or contribute to.

Used herein, the term "plant health" means the viability, size, growth, nutrient sufficiency, and freedom from disease of a plant.

Used herein, the term "screenings" means any material left over from the process of cleaning, sorting, milling or otherwise processing seed.

Used herein, the terms "fixing nitrogen", "nitrogen fixation", and "nitrogen fixing" mean to convert $N_2$ gas to ammonia ($NH_3$) or related nitrogenous compounds. Non-limiting examples of nitrogen fixing microbes include species from a genus selected from the group consisting of *Achromobacter, Acidithiobacillus, Acidovorax, Acidovoraz, Acinetobacter, Actinoplanes, Adlercreutzia, Aerococcus, Aeromonas, Afipia, Agromyces, Ancylobacter, Arthrobacter, Atopostipes, Azospirillum, Bacillus, Bdellovibrio, Beijerinckia, Bosea, Bradyrhizobium, Brevibacillus, Brevundimonas, Burkholderia, Candidatus Haloredivivus, Caulobacter, Cellulomonas, Cellvibrio, Chryseobacterium, Citrobacter, Clostridium, Coraliomargarita, Corynebacterium, Cupriavidus, Curtobacterium, Curvibacter, Deinococcus, Delftia, Desemzia, Devosia, Dokdonella, Dyella, Enhydrobacter, Enterobacter, Enterococcus, Erwinia, Escherichia, Escherichia/Shigella, Exiguobacterium, Ferroglobus, Filimonas, Finegoldia, Flavisolibacter, Flavobacterium, Frigoribacterium, Gluconacetobacter, Hafnia, Halobaculum, Halomonas, Halosimplex, Herbaspirillum, Hymenobacter, Klebsiella, Kocuria, Kosakonia, Lactobacillus, Leclercia, Lentzea, Luteibacter, Luteimonas, Massilia, Mesorhizobium, Methylobacterium, Microbacterium, Micrococcus, Microvirga, Mycobacterium, Neisseria, Nocardia, Oceanibaculum, Ochrobactrum, Okibacterium, Oligotropha, Oryzihumus, Oxalophagus, Paenibacillus, Panteoa, Pantoea, Pelomonas, Perlucidibaca, Plantibacter, Polynucleobacter, Propionibacterium, Propioniciclava, Pseudoclavibacter, Pseudomonas, Pseudonocardia, Pseudoxanthomonas, Psychrobacter, Rahnella, Ralstonia, Rheinheimera, Rhizobium, Rhodococcus, Rhodopseudomonas, Roseateles, Ruminococcus, Sebaldella, Sediminibacillus, Sediminibacterium, Ser-*

*ratia, Shigella, Shinella, Sinorhizobium, Sinosporangium, Sphingobacterium, Sphingomonas, Sphingopyxis, Sphingosinicella, Staphylococcus, Stenotrophomonas, Strenotrophomonas, Streptococcus, Streptomyces, Stygiolobus, Sulfurisphaera, Tatumella, Tepidimonas, Thermomonas, Thiobacillus, Variovorax, Xanthomonas,* and/or *Zimmermannella.*

Used herein, the terms "solubilizing phosphate" and "phosphate solubilizing" mean to make phosphate available for plant uptake and metabolism. Non-limiting examples of phosphate solubilizing microbes include species from a genus selected from the group consisting of *Acinetobacter, Arthrobacter, Arthrobotrys, Aspergillus, Azospirillum, Bacillus, Burkholderia, Candida Chryseomonas, Enterobacter, Eupenicillium, Exiguobacterium, Glomus, Klebsiella, Kluyvera, Microbacterium, Mucor, Paecilomyces, Paenibacillus, Penicillium, Pseudomonas, Serratia, Stenotrophomonas, Streptomyces, Streptosporangium, Swaminathania, Thiobacillus, Torulospora, Vibrio, Xanthobacter,* and/or *Xanthomonas.*

EXAMPLES

Specific embodiments of this invention are illustrated by the following non-limiting Examples. Any variations obvious to a skilled person are intended to fall within the scope of this invention.

Example 1. Preparation of Agriculturally Acceptable Carriers Comprising Milled Plant Parts and Biological Viability Compounds Hulls of peas, lentils, and oats, wheat straw and canola screenings were acquired from farms, seed cleaners, and processors and dried at 40° C. in a lab oven for 72 hours. In each case, the plant material was ground to a fine powder in a blender and then a burr mill. The milled material was sieved through a No. 18 mesh sieve to remove larger particles. For each plant type, 0.9 kg of sieved milled material was mixed by hand with 200 ml of a liquid blend of biological viability compounds comprising 250 g/l sucrose, 150 g/l maltose, 50 g/l yeast extract, 25 g/l sorbitol, 22.5 g/l lactose, and 2.5 g/l methionine in water. Once thoroughly combined, the mixture was processed into granules through a pellet mill with a 2 mm die aperture. The resulting granules were 2 mm wide and about 2 to about 6 mm long. The granules were dried at 40° C. in a lab oven for 72 hours. The dried granule compositions are listed in Table 1.

TABLE 1

| | | Biological viability compounds (% w/w) | | | | | |
|---|---|---|---|---|---|---|---|
| | Milled plant parts | Sucrose | Yeast extract | Lactose | Maltose | Sorbitol | Methionine |
| Granule 1 | lentil and pea hull | 5 | 1 | 0.45 | 3 | 0.5 | 0.05 |
| Granule 2 | oat hull | 5 | 1 | 0.45 | 3 | 0.5 | 0.05 |
| Granule 3 | wheat straw | 5 | 1 | 0.45 | 3 | 0.5 | 0.05 |
| Granule 4 | Canola screenings | 5 | 1 | 0.45 | 3 | 0.5 | 0.05 |

Composition of agriculturally acceptable carriers

Example 2. Demonstrating Microbial Stability on the Carriers at Low Moisture An advantageous property of this invention is the stability of the microbes on the carrier after application at low moisture. We tested the stability of *Bradyrhizobium japonicum*, *Rhizobium leguminosarum*, *Azospirillum brasilense*, and *Penicillium bilaiae* on the granule types listed in Table 1. We first tested the percent moisture of granules that had been sitting in paper bags for between 2 weeks and a month after preparation as described above by weighing the granules, oven drying them, and then immediately reweighing them. Using this procedure, we determined that the granules were about 10% moisture.

To inoculate the granules with the microbes, we grew the microbes in either yeast mannitol broth (YEM, in g/l mannitol, 10; $K_2HPO_4$, 0.5; $MgSO_4 \cdot 7H_2O$, 0.2; NaCl, 0.1; $CaCO_3$,3) for *B. japonicum* and *R. leguminosarum*; tryptone yeast glycerol broth (TYG, in g/l tryptone, 5; yeast extract, 5; NaCl, 1.2; $MgSO_4 \cdot 7H_2O$, 0.25; $K_2HPO_4$, 0.13; $CaCl_2$, 0.22; $K_2SO_4$, 0.17; $Na_2SO_4$, 2.4; $NaHCO_3$, 0.5; $Na_2CO_3$, 0.09; Fe(III) EDTA, 0.07) for *A. brasilense* or on potato dextrose agar (PDA, in g/l potato extract, 4; dextrose, 20; agar, 15) for *P. bilaiae*. *A. brasilense*, *B. japonicum* and *R. leguminosarum* were harvested by centrifugation and resuspended in 0.01% Tween 80. *P. bilaiae* spores were harvested by rinsing the surface of the agar plates 0.01% Tween 80. Cell concentrations were determined in a Petroff-Hausser chamber. *B. japonicum* and *R. leguminosarum* were applied at a calculated rate of $1 \times 10^9$ cells/g onto granules 1, 2, and 3 from Table 1 using a handheld sprayer in a volume of water to bring the final percent moisture of the granule to 15%. *A. brasilense* was applied at a calculated rate of $5 \times 10^5$ cells/g onto granules 1, 2, and 3 from Table 1 using a handheld sprayer in a volume of water to bring the final percent moisture of the granule to 15%. *P. bilaiae* was applied at a calculated rate of $5 \times 10^4$ cells/g onto granule 4 from Table 1 using a handheld sprayer in a volume of water to bring the final percent moisture of the granule to 15%.

Figure 2:
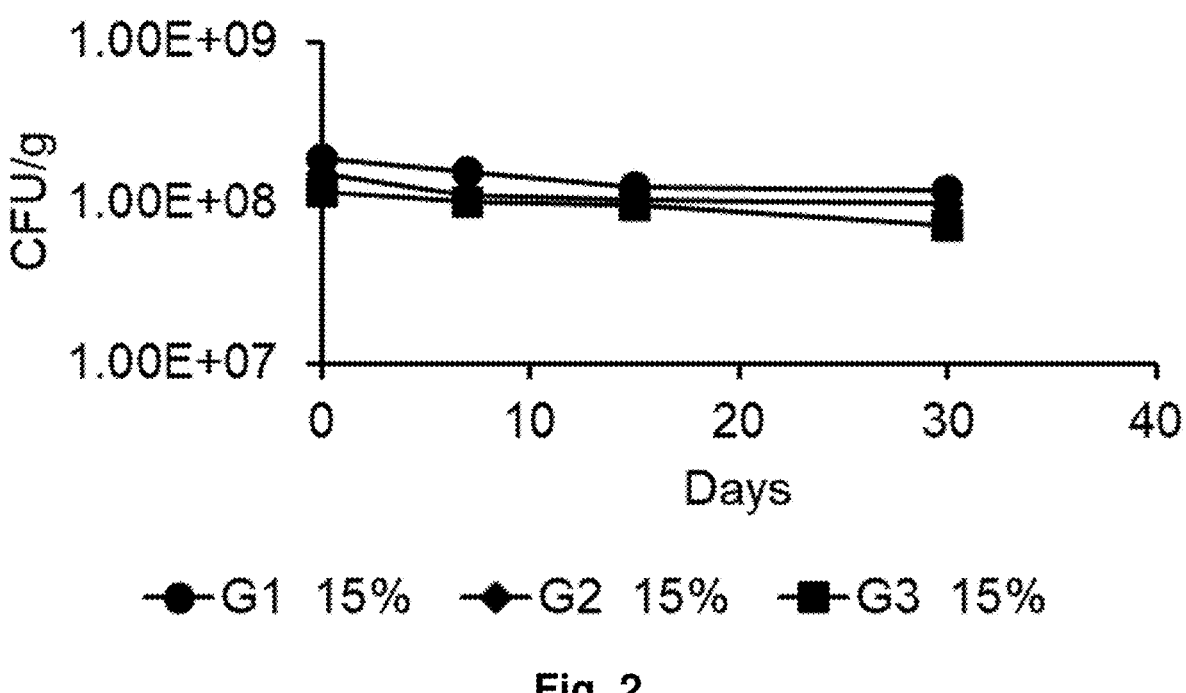
FIG. 2: *Rhizobium leguminosarum* titer at 15% moisture on 3 different granular carriers (G1-G3).
Figure 3:
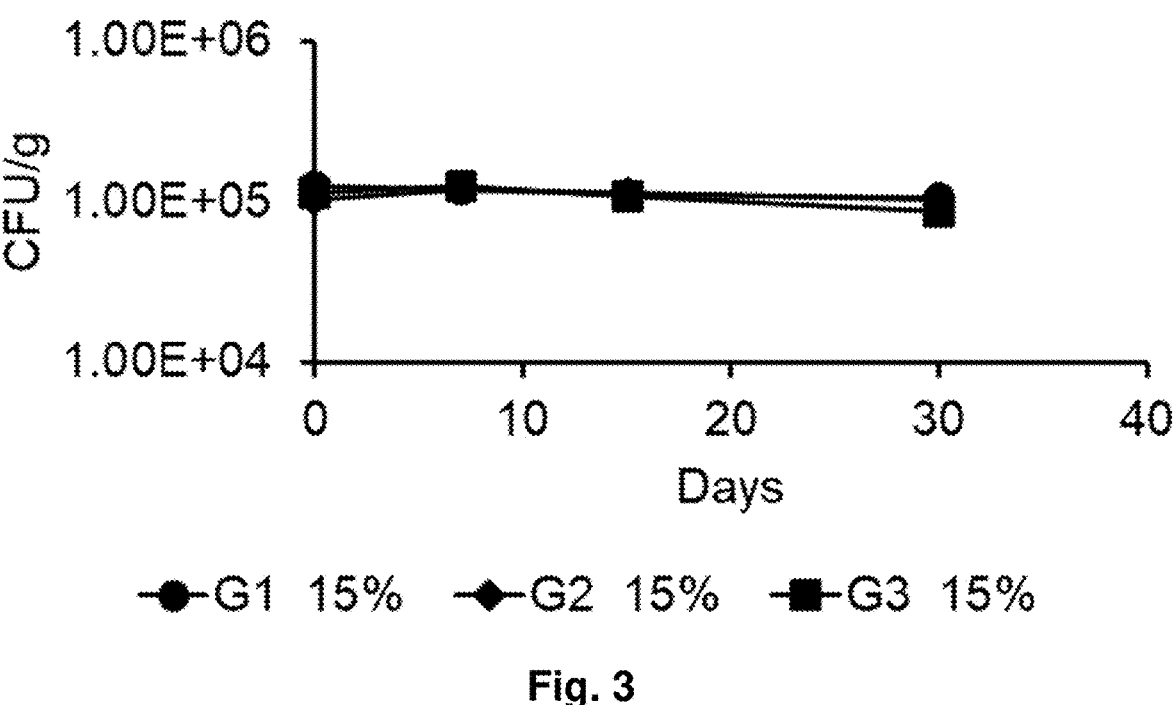
FIG. 3: *Azospirillum brasilense* titer at 15% moisture on 3 different granular carriers (G1-G3).
Figure 4:
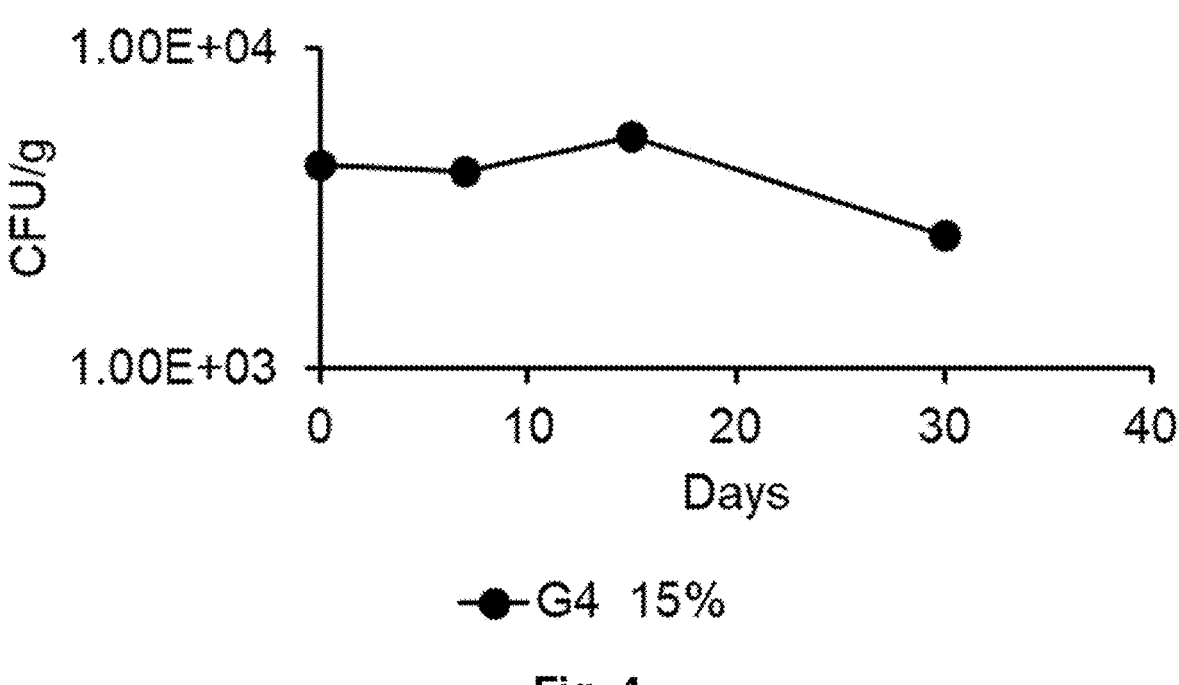
FIG. 4: *Penicillium* bilaiae titer at 15% moisture on a granular carrier (G4).

The granules inoculated with the 4 different microbes were stored in plastic bags at 10° C. and sampled at 1 hour after inoculation, and 7, 15, and 30 days after inoculation. At each sampling time, the cells were rinsed off the granules by vigorous shaking for 5 minutes in 0.01% Tween 80, followed by serial dilution and plating on the appropriate medium (YEM agar, TYG agar or PDA, as appropriate). The plates were incubated at 28° C. until countable colonies were present. FIG. 1 shows the number of *B. japonicum* colony forming units (CFU) per gram of granules at each time point, showing that the microbe remains stable over the 30 day period. FIG. 2 shows the number of *R. leguminosarum* colony forming units (CFU) per gram of granules at each time point, showing that the microbe remains stable over the 30 day period. FIG. 3 shows the number of *A. brasilense* colony forming units (CFU) per gram of granules at each time point, showing that the microbe remains stable over the 30 day period. FIG. 4 shows the number of *P. bilaiae* colony forming units (CFU) per gram of granules at each time point, showing that the microbe remains stable over the 30 day period.

Example 3. Demonstrating Microbial Growth on the Carriers at High Moisture

Figure 5:
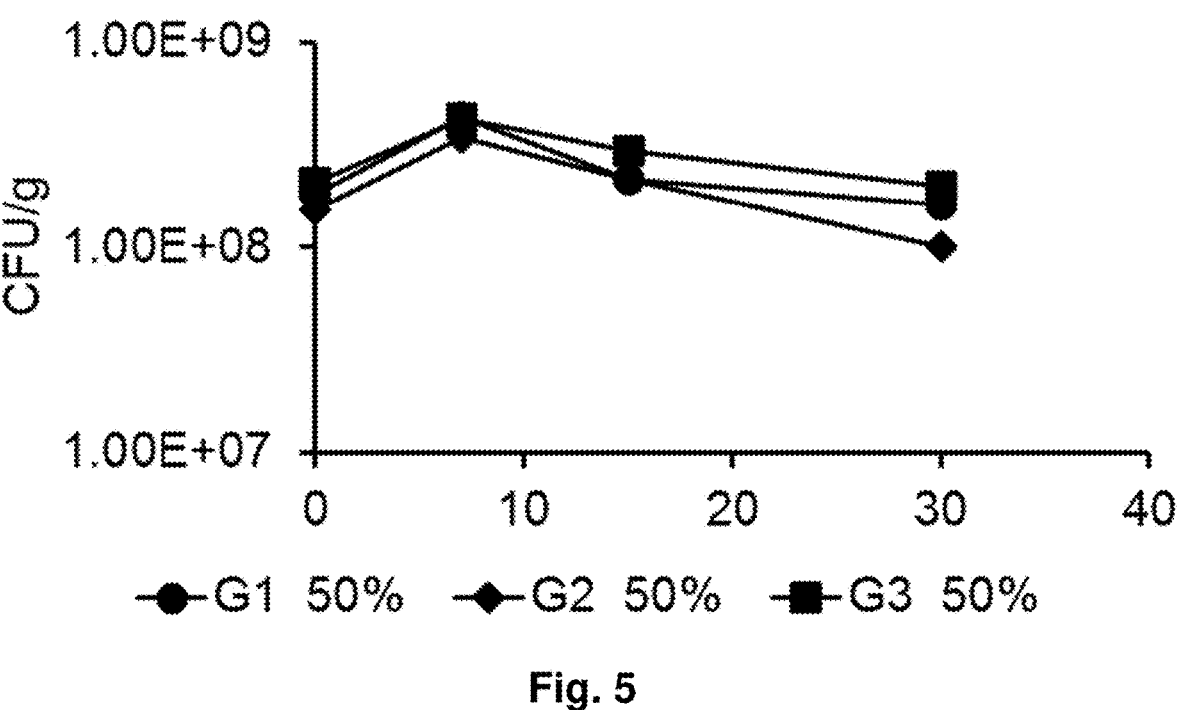
FIG. 5: *Bradyrhizobium japonicum* titer at 50% moisture on 3 different granular carriers (G1-G3).
Figure 6:
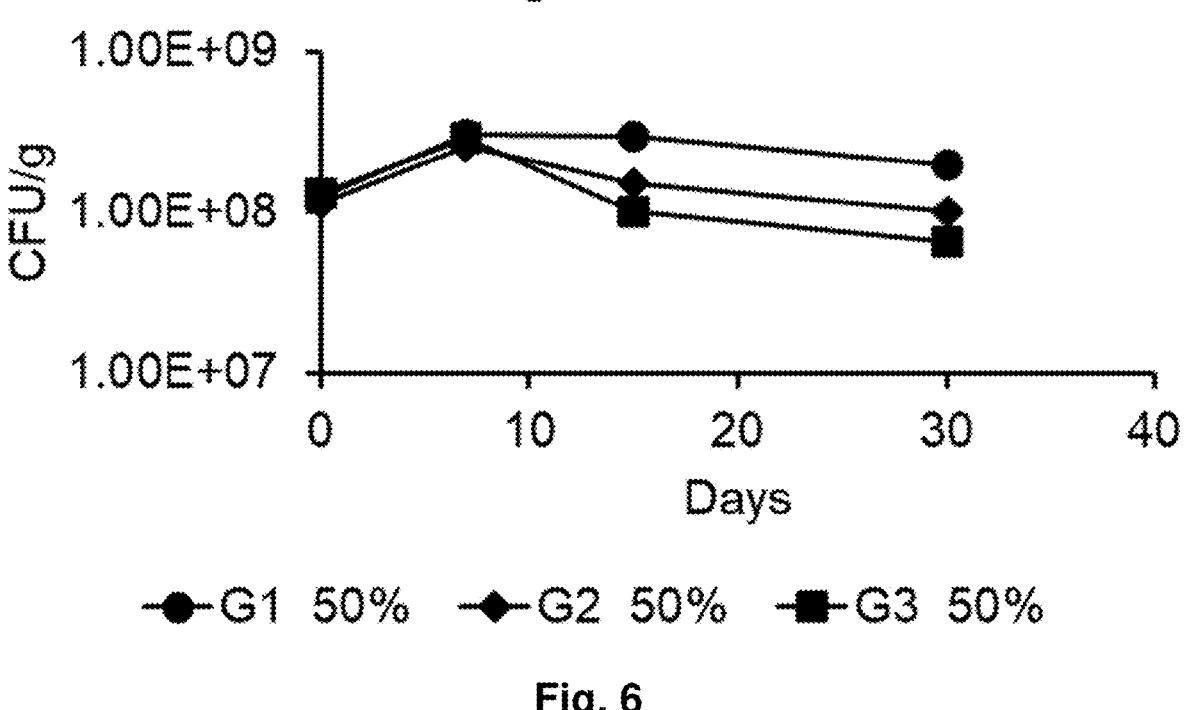
FIG. 6: *Rhizobium leguminosarum* titer at 50% moisture on 3 different granular carriers (G1-G3).
Figure 7:
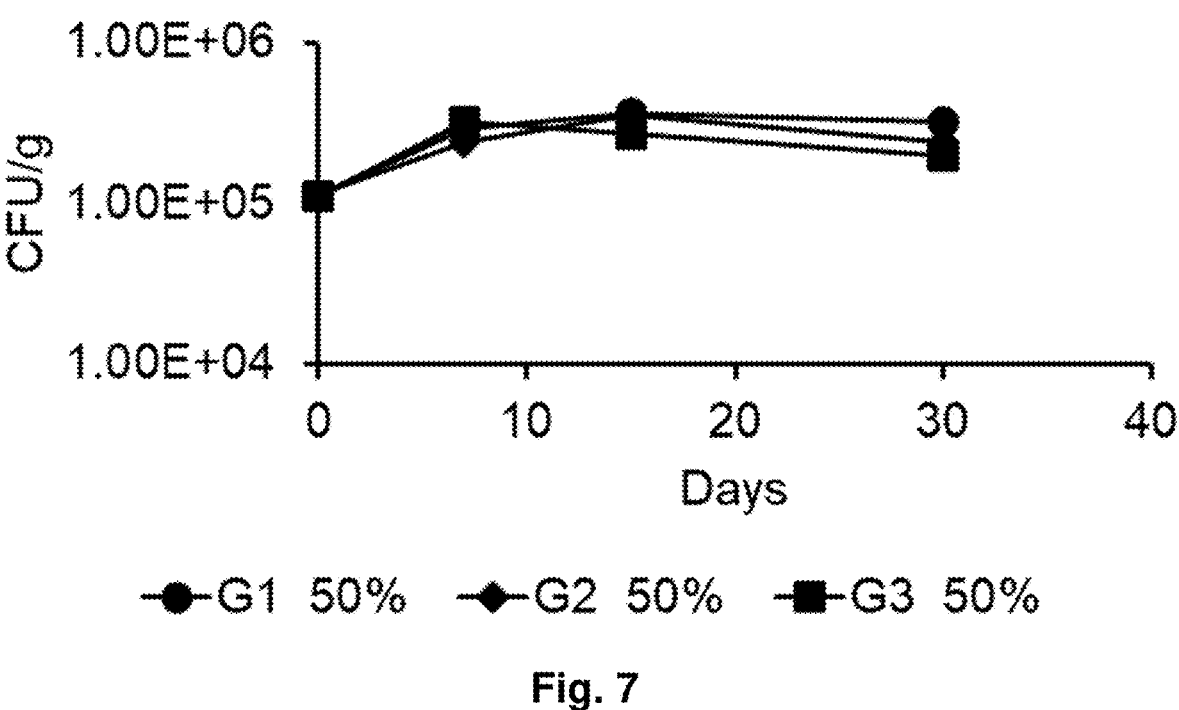
FIG. 7: *Azospirillum brasilense* titer at 50% moisture on 3 different granular carriers (G1-G3).
Figure 8:
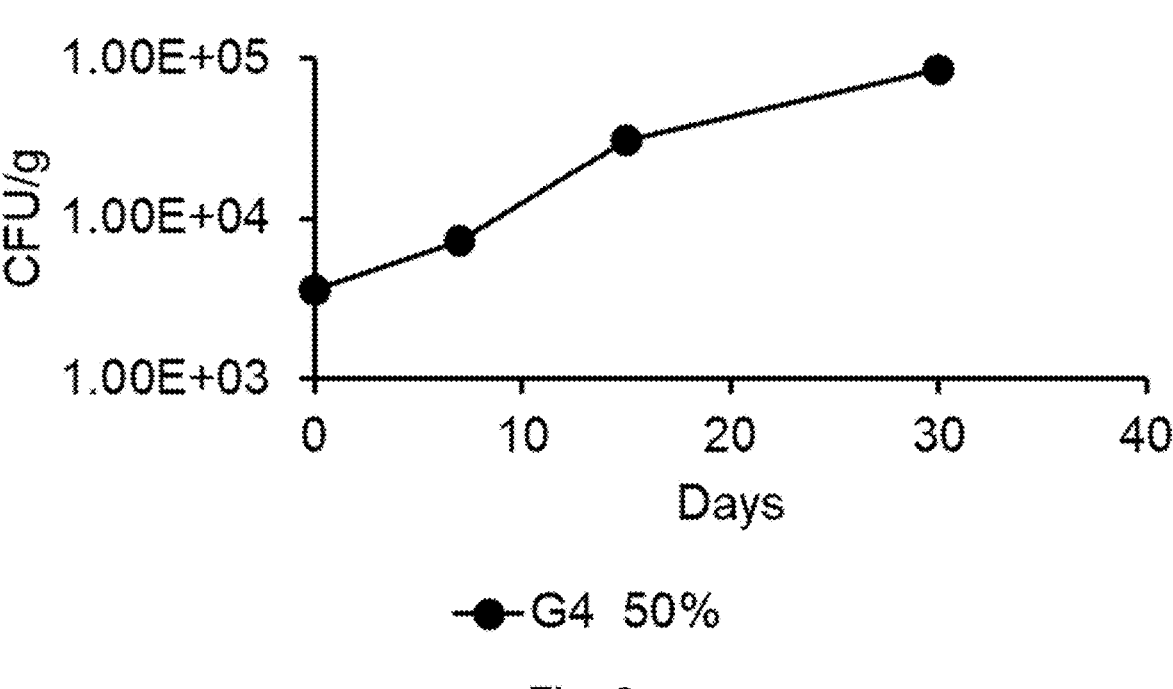
FIG. 8: *Penicillium* bilaiae titer at 50% moisture on a granular carrier (G4).

An advantageous property of this invention is that the carrier itself supports microbial growth, which allows for delivery of a higher titer of microbes when applied to e.g.

moist soil. Using the procedure described in Example 2 above to create inoculated granules with *P. bilaiae*. *A. brasilense*, *B. japonicum* and *R. leguminosarum*, we tested the ability of the compositions to support microbial growth at high moisture. After application of the microbes in 0.01% Tween 80, as described above, we increased the moisture of the granules to 50% by spraying the granules with an additional 35% (w/w) of sterile reverse osmosis water. The inoculated, moistened granules were then placed in plastic bags and stored at 20° C., and sampled at 1 hour after application of water, and 7, 15 and 30 days after application of water, and CFU/g of granules were determined. FIG. 5 shows the number of *B. japonicum* colony forming units (CFU) per gram of granules at each time point, showing that the microbe doubled in titer in the first 7 days of incubation. FIG. 6 shows the number of *R. leguminosarum* colony forming units (CFU) per gram of granules at each time point, showing that the microbe doubled in titer in the first 7 days of incubation. FIG. 7 shows the number of *A. brasilense* colony forming units (CFU) per gram of granules at each time point, showing that the microbe doubled in titer in the first 7 days of incubation. FIG. 8 shows the number of *P. bilaiae* colony forming units (CFU) per gram of granules at each time point, showing that the microbe doubled in titer in the first 7 days of incubation.

Example 4. Increased Leaf Phosphorus in Corn and Canola by Delivery of Phosphate Solubilizing Microbes on the Granules To demonstrate that the invention can be used to promote plant health by increasing phosphate uptake, we tested leaf phosphorus concentrations of corn and canola plants grown in the presence of the granules described in Table 1 and carrying known phosphate solubilizing microbes *Penicillium bilaiae* and *Bacillus amyloliquefaciens*. Granules 1 and 2 from Table 1 were inoculated with either $5.0 \times 10^4$ CFU/g *P. bilaiae* or $1.0 \times 10^5$ CFU/g *B. amyloliquefaciens*. The amount of each granule type added per pot was calculated by dividing the target rate of 10 lbs per acre of granules by the surface area of the pot in acres multiplied by 3 to account for the depth of the pot. All of the plants were grown in calcined clay. The granules were mixed with the clay in a rotary cement mixer. The corn was Pioneer hybrid P7202AM and the canola hybrid was BASF InVigor L345PC. The plants were grown in 3.5″ plastic square pots in a greenhouse in Osler, Saskatchewan managed by Undercover Horticulture Ltd. The plants were watered with city water through drippers inserted into each pot. Twelve corn plants and 12 canola plants were grown for each treatment.

The above ground portions of plants were harvested at the V1 and 2 leaf growth stages of corn and canola, respectively, and frozen upon harvesting. Each sample represented a single plant. Plants that were sickly or stunted were also discarded from both experiments. When ready for the assay, plant tissues were thawed and dried in an oven at 80° C. until a constant weight was reached. Dried tissues were then ground up to a fine powder, and 50 mg of tissues were completely digested using concentrated sulfuric acid and hydrogen peroxide and the final reaction volume was adjusted to 1 mL. The phosphate content of the sample was determined using Malachite Green Phosphate Assay Kit (Sigma-Aldrich) according to the manufacturer's instructions.

Figure 9:
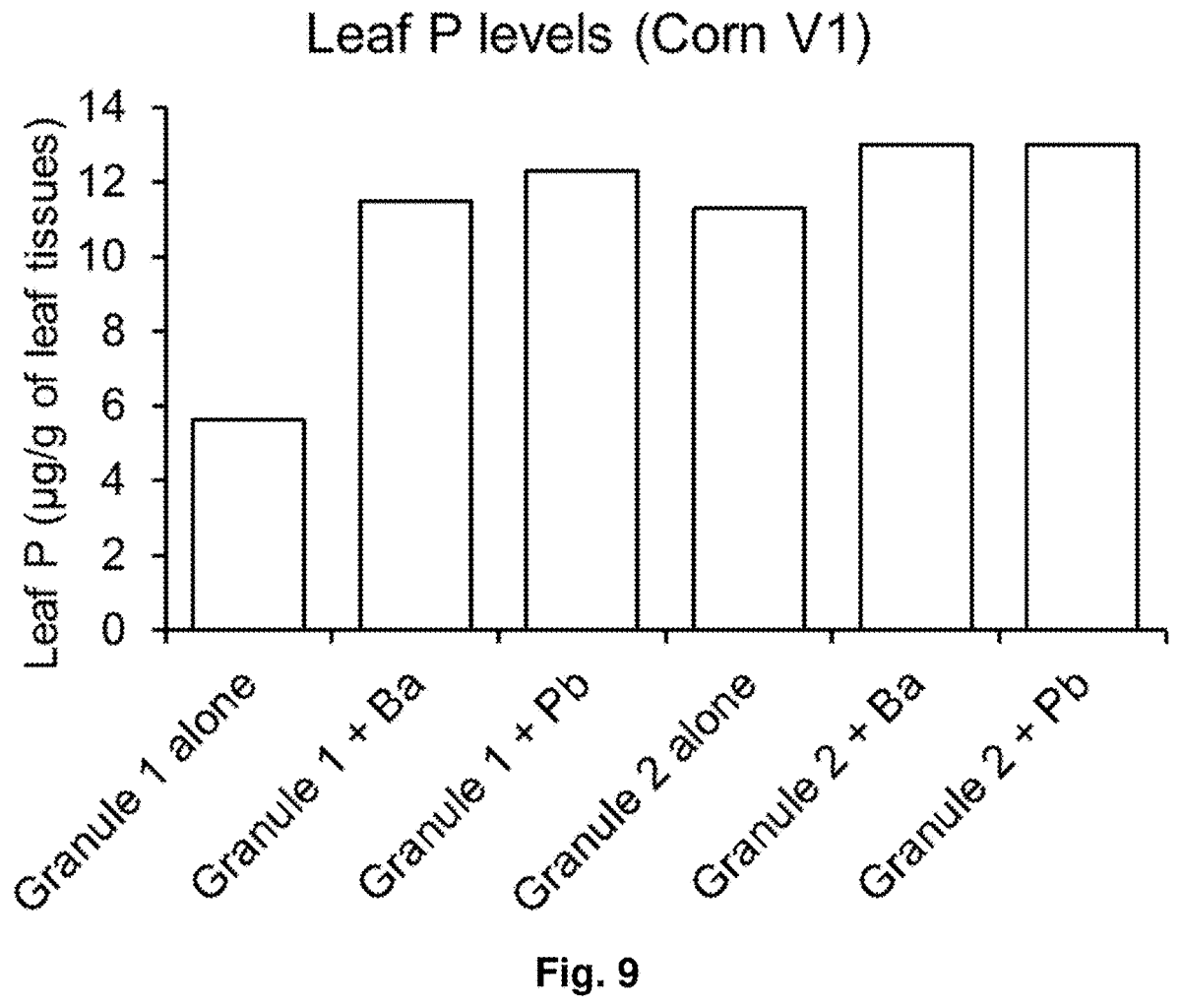
Figure 10:
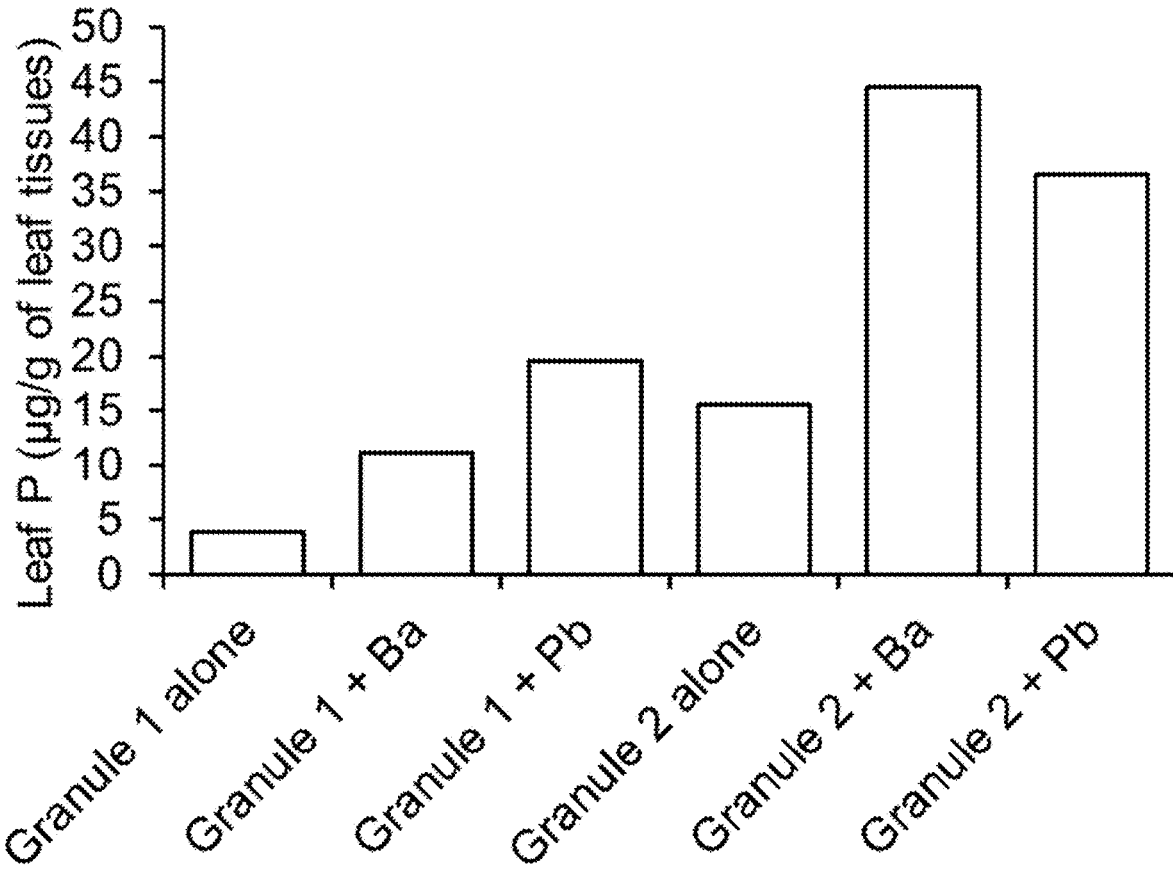
FIG. 10: Leaf phosphate levels in 2 leaf canola plants grown in soil inoculated with either of 2 granule types (Granule1 or Granule 2) carrying *Bacillus amyloliquefaciens* (Ba) or *Penicillium bilaiae* (Pb), showing an increase in phosphate concentrations in the canola leaves grown with the phosphate solubilizing microbes.

In corn, granules 1 and 2 from Table 1 carrying *B. amyloliquefaciens* had 105% and 15% more leaf phosphate, respectively, than the granules without the microbe (FIG. 9), demonstrating the ability of the granules to deliver viable bacteria and promote plant health in monocot plants. Similarly, in corn, granules 1 and 2 carrying *P. bilaiae* had 119% and 15% more leaf phosphate, respectively, than the granules without the microbe (FIG. 9), demonstrating the ability of the granules to deliver viable fungi and promote plant health in monocot plants. In canola, granules 1 and 2 from Table 1 carrying *B. amyloliquefaciens* had 186% and 188% more leaf phosphate, respectively, than the granules without the microbe (FIG. 10), demonstrating the ability of the granules to deliver viable bacteria to increase plant phosphate levels and promote plant health in dicot plants. Similarly, in corn, granules 1 and 2 carrying *P. bilaiae* had 405% and 135% more leaf phosphate, respectively, than the granules without the microbe (FIG. 10), demonstrating the ability of the granules to deliver viable fungi to increase plant phosphate levels and promote plant health in dicot plants.

Example 5. Control of Root Rot Disease in Peas by Delivery of Biocontrol Organisms on the Granules To demonstrate that the invention can be used to control plant disease, we created granules with known biological control agents and tested their ability to protect pea plants from root rot. Granule carrier type 1 was prepared according to Table 1 and inoculated with either $5.0 \times 10^4$ CFU/g *Trichoderma harzianum* or $1.0 \times 10^5$ CFU/g *Bacillus subtilis*. The yellow pea variety was CDC Meadow. The control was granule carrier 1 without any biocontrol organism. Twelve plants were planted for each treatment in vermiculite in 3.5" pots. The root rot pathogens *Rhizoctonia solani, Fusarium avenaceum* and *Pythium ultimum* were maintained on potato dextrose agar (PDA) at room temperature. The amount of each granule type added per pot was calculated by dividing the target rate of 10 lbs per acre of granules by the surface area of the pot in acres multiplied by 3 to account for the depth of the pot. The vermiculite containing granules was inoculated with the pathogens by adding a 5 mm agar plug from a fresh culture of each of the 3 pathogens to the vermiculite 15 days after planting. The plants were grown in a growth chamber at Insight Plant Health and watered daily. The temperature in the growth chamber was 26° C. during the day and 22° C. at night. LED lighting provided approximately 200 μmol/m²/s at the canopy surface.

Figure 11:
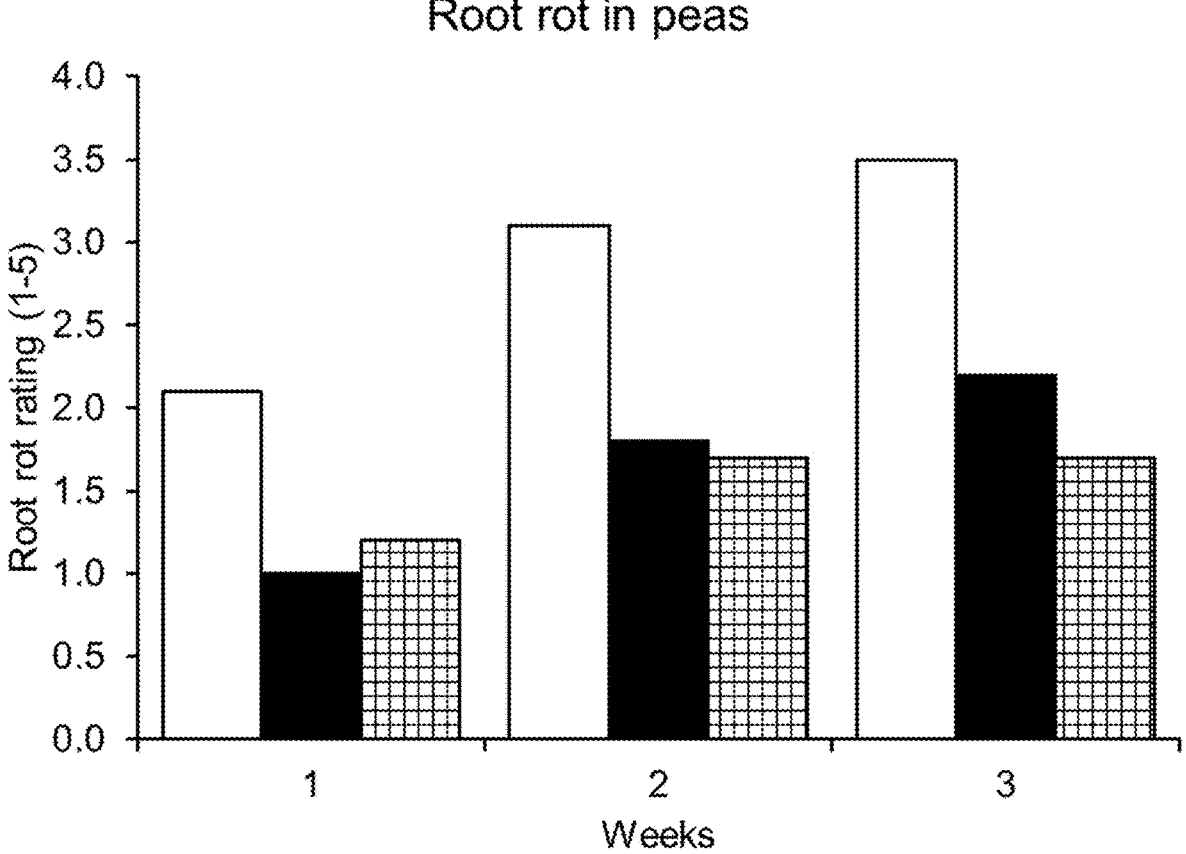
FIG. 11: Control of root rot in peas by *Trichoderma harzianum* or *Bacillus subtilis* carried on plant-based granules.

Four randomly selected plants from each treatment were harvested at 1 week intervals after inoculation and scored for root rot disease symptoms on a 1 to 5 scale, where 5 was completely dead and rotted and 1 was symptom free. Pea plants grown with *T. harzianum* granules had reductions in root rot severity of 110%, 72% and 59% at weeks 1, 2, and 3 after inoculation, respectively (FIG. 11). Pea plants grown with *B. subtilis* granules had reductions in root rot severity of 75%, 82% and 106% at weeks 1, 2, and 3 after inoculation, respectively (FIG. 11). Together, the results demonstrate that the invention can be used to control plant diseases when applied to soil near a seed.

Example 6. Development of Nitrogen Fixing Nodules Following Delivery of Nitrogen Fixing Microbes on the Granules Granule carrier types 1 and 2 were prepared according to Table 1 and sterilized in glass jars in an autoclave. Following autoclaving, the jars were placed in a 40° C. in a lab oven for 72 hours. The sterilized granules were then inoculated with *Rhizobium leguminosarum* as described in Example 2 to a final titer of $1.0 \times 10^8$ CFU/g. Leonard jar assemblies were created as described in [Leonard, L. T. (1943). A simple assembly for use in the testing of cultures of *rhizobia.* Journal of Bacteriology, 45 (6), 523-527] using open bottomed autoclavable plastic bottles mounted on top of glass mason jars. Approximately 550 mL of pre-wetted vermiculite was used to fill the top plastic part and a cotton wick was from the vermiculite down into the mason jar to provide a constant supply of nutrient solution to the growth medium. A cotton ball was inserted at the mouth of the plastic bottle to prevent the growth medium from falling into the nutrient solution. Six hundred fifty mL of Hoaglands No.2 Basal Salt Mix nutrient solution without nitrogen (Sigma-Aldrich) was used to fill the mason jar and the entire assembly was wrapped with tin foil and autoclaved.

All handling of the assemblies and granules was conducted aseptically in a biosafety cabinet. CDC Proclaim lentil seeds were sterilized using 3% bleach and washed with sterile reverse osmosis water seven times and then dried in a biosafety cabinet for 2 hours. Seeds were planted in the Leonard jar vermiculite together with 5 inoculated granules of each granule type. The controls did not have granules added with the seeds. Control seeds were inoculated with sterile reverse osmosis water (negative control) or with $1.0 \times 10^5$ CFU *R. leguminosarum* (positive control). A layer of sterilized sand was added to the top of the vermiculite following planting to minimize evaporation. Three Leonard jars per treatment were randomly placed in a growth chamber with 16 h days and 8 h nights photoperiod. The temperature in the growth chamber was 24° C. during the day and 18° C. at night. LED lighting provided approximately 200 μmol/m²/s at the canopy surface.

Figure 12:
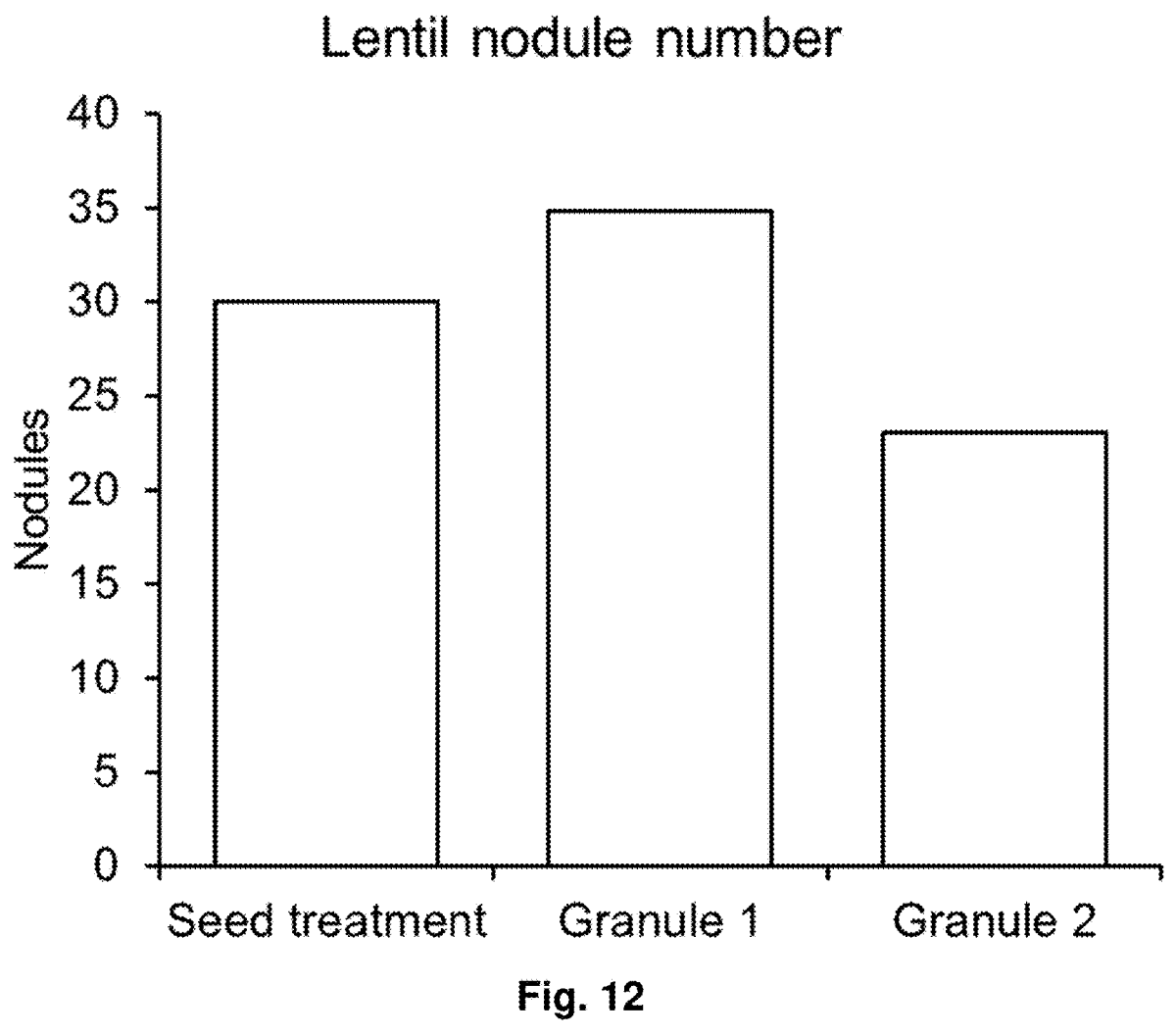

Seeds germinated after 3 to 4 days. Relative humidity of 30-40% was maintained in the growth chamber using a cool mist humidifier to ensure the growth medium did not dry out. Plants were harvested on the 30th day after planting and nodule numbers were recorded. The negative control plants had no nodules. FIG. 12 shows that nitrogen fixing microbes delivered on the plant-based carriers described herein had similar numbers of nodules to seed treated with the microbes.

While the preferred embodiments of the invention have been described above, it will be recognized and understood that various modifications may be made therein, and the appended claims are intended to cover all such modifications which may fall within the spirit and scope of the invention.

The embodiments of the invention in which an exclusive property or privilege is claimed are defined as follows:

1. An agricultural composition for delivering microbes to plants comprising:

an agriculturally acceptable granular carrier comprising about 80% to about 99.9% one or more milled plant parts (w/w), about 0.1% to about 20% biological viability compounds (w/w) by total weight of the granular carrier, said granular carrier comprising about 15% moisture and a size range of about 1 mm to about 10 mm; and at least one live microbe selected from the group consisting of a nitrogen-fixing microbe; a phosphate solubilizing microbe; and a biological control microbe active against soil-borne plant pathogens;

wherein the one or more milled plant parts are selected from at least one crop plant selected from the group consisting of pea, lentil, chickpea, faba bean, soybean, alfalfa, canola, mustard, flax, cotton, wheat, barley, corn, oat, rice, and sorghum;

wherein the one or more milled plant parts are hulls, straw, and/or screenings from the at least one crop plant; and wherein at least one biological viability compound is selected from the group consisting of sucrose, maltose, lactose, trehalose, yeast extract, sorbitol, glycerol, mannitol, inositol, methionine, cysteine, homocysteine, and taurine, wherein the microbe does not have more than a 1-log loss in titer over a one-month period below about 20% moisture (w/w), and wherein the microbe doubles in titer over a one-week period above about 50% moisture (w/w).

2. The composition as defined in claim 1, wherein the at least one live microbe is a nitrogen fixing microbe selected from the group consisting of *Rhizobium spp., Bradyrhizobium spp., Sinorhizobium spp., Mesorhizobium spp., Azospirillum spp., Methylobacterium spp.*, and *Gluconacetobacter spp.*

3. The composition as defined in claim 1, wherein the at least one live microbe is a phosphate solubilizing microbe selected from the group consisting of *Bacillus* spp., *Pseudomonas* spp., and *Penicillium* spp.

4. The composition as defined in claim 1, wherein the at least one live microbe is a biological control microbe active against soil-borne plant pathogens selected from the group consisting of *Bacillus* spp., *Trichoderma* spp., and *Streptomyces* spp.

5. A method for growing a plant comprising:

providing the composition as defined in claim 1; and (i) applying the meistened composition to soil within a growing zone of a plant; or (ii) applying the meistened composition to soil; and planting a seed in said soil.

\* \* \* \* \*